US006958981B1

(12) United States Patent  
Hemminger

(10) Patent No.: US 6,958,981 B1
(45) Date of Patent: Oct. 25, 2005

(54) SYNCHRONIZED WEB SCROLLING

(75) Inventor: Donald F. Hemminger, Beavercreek, OH (US)

(73) Assignee: NCR Corporation, Dayton, OH (US)

( * ) Notice: Subject to any disclaimer, the term of this patent is extended or adjusted under 35 U.S.C. 154(b) by 598 days.

(21) Appl. No.: 09/317,312

(22) Filed: May 24, 1999

(51) Int. Cl.$^7$ .............................................. H04L 12/16
(52) U.S. Cl. ..................................... 370/270; 709/205
(58) Field of Search ....................... 370/270; 709/204, 709/205

(56) References Cited

U.S. PATENT DOCUMENTS

| | | | | |
|---|---|---|---|---|
| 5,008,853 A | * | 4/1991 | Bly et al. ..................... 345/2.1 |
| 5,113,252 A | | 5/1992 | Horie et al. ................... 358/77 |
| 5,220,657 A | * | 6/1993 | Bly et al. ..................... 345/751 |
| 5,420,666 A | | 5/1995 | Ariga et al. .................. 355/206 |
| 5,508,713 A | | 4/1996 | Okouchi ........................ 345/1 |
| 5,550,638 A | | 8/1996 | Ikeda et al. .................. 358/296 |
| 5,703,694 A | | 12/1997 | Ikeda et al. .................. 358/296 |
| 5,734,835 A | | 3/1998 | Selker .................... 395/200.79 |
| 5,736,984 A | | 4/1998 | Jellinek et al. ............. 345/338 |
| 6,072,463 A | * | 6/2000 | Glaser ........................ 345/753 |
| 6,157,381 A | * | 12/2000 | Bates et al. .................. 345/684 |
| 6,158,903 A | * | 12/2000 | Schaeffer et al. ........... 709/204 |
| 6,297,819 B1 | * | 10/2001 | Furst ........................... 345/733 |
| 6,342,906 B1 | * | 1/2002 | Kumar et al. ................ 345/751 |
| 6,411,988 B1 | * | 6/2002 | Tafoya et al. ................ 370/260 |

* cited by examiner

Primary Examiner—Hassan Kizou
Assistant Examiner—Dmitry Levitan
(74) Attorney, Agent, or Firm—Gregory A. Welte

(57) ABSTRACT

A video conferencing system. In a type of conferencing known as "synchronized browsing," several computers download a common web page from a public-access, packet-switched network, such as the Internet. Software in a first computer informs the other computers how the first computer is navigating through the web page, and sends the other computers data which enables them to navigate the same path, so that all computers navigate in synchrony, and display the same sequence of images. Under the invention, while such a web page is being navigated by such computers, software observes one of them, and looks for the event of scrolling (as opposed to navigation). When scrolling is detected, its termination is awaited. When termination occurs, the invention tells the other computers which part of the page is currently being displayed, so that the others can navigate to that part and also display it.

16 Claims, 9 Drawing Sheets

SYNCHRONIZED WEB SCROLLING

The invention concerns synchronization of scrolling through documents in multiple computers, particularly when those computers contain copies of a single document, which was retrieved from a single source, such as a web site.

BACKGROUND OF THE INVENTION

"Synchronized browsing" represents one type of video conferencing. In synchronized browsing, multiple parties, at different computers, view a common image, such as a single web page. The web page originates from a remote server, which distributed the web page to the parties through a public-access, packet-switched network, such as the Internet.

When one party, such as the leader of the conference, navigates through the page, different images will appear on the leader's computer. This navigation process is caused by commands which the leader issues to the leader's computer. The synchronized browsing system distributes these commands to the computers of the other parties, which then execute the same commands. These commands may be executed exclusively by the computers in question, or they may entail issuance of commands to the server, to attain additional data packets.

Under this process, all parties continually view the same, common, image as contained on the leader's computer, even as that image changes.

OBJECTS OF THE INVENTION

An object of the invention is to provide improved internet-based collaboration.

SUMMARY OF THE INVENTION

In one form of the invention, a host computer, which is a member of a group of computers, scrolls through a document. When the scrolling terminates, the host computer sends a message to the other computers indicating the part of the document which the host computer is displaying. The other computers then also display that part which the host displays.

DETAILED DESCRIPTION OF THE INVENTION

Figure 1:
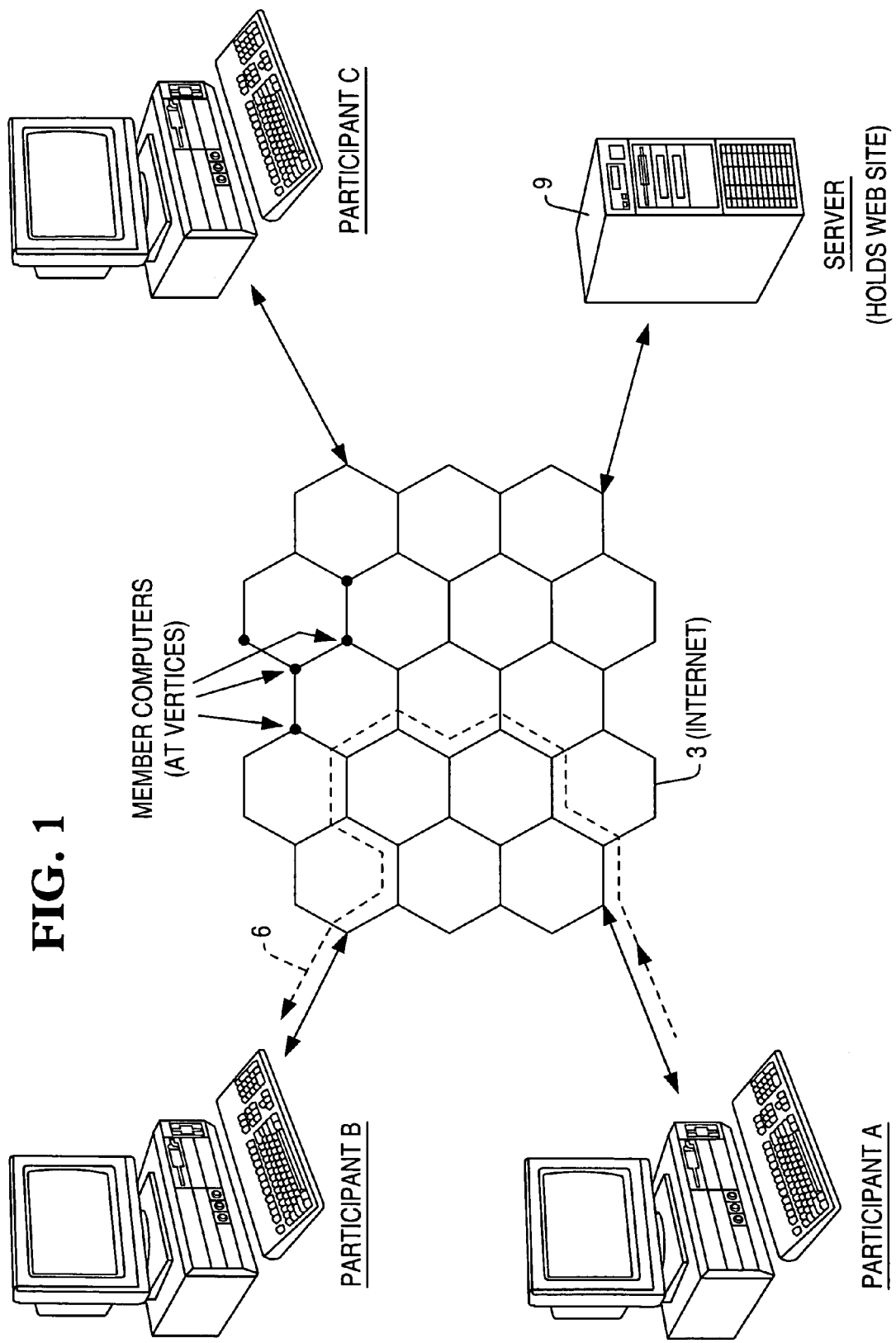
FIG. 1 illustrates computers interconnected by a packet-switched network, such as the Internet.

FIG. 1 illustrates three participants, A through C, who are connected to a public-access, packet-switched network 3, such as the INTERNET, as indicated.

FIG. 1 also shows a SERVER, which is also linked to the network 3.

Two features of packet-switched networks are important. One is that messages are transmitted in the form of "packets," which are collections of binary data. For example, if the SERVER is to transmit a large document to the computer of a participant, the SERVER will package the document into several packets, and transmit them to the participant's computer.

A second feature is that, when parties transmit packets to each other, no direct connection (in general) exists between the parties. Rather, the sending party places the address of the receiving party onto the packet and delivers the packet to one of the member-computers of the network. That member relays the packet to another member, and the relay process continues until the packet reaches the receiving party. For example, when participant A sends a packet to participant B, the packet may follow the route indicated by dashed arrow 6. The vertices of the hexagons 9 represent the member-computers, which pass the packet along.

These two features allow communication to occur between a very large number of pairs of parties. In fact, the number of pairs of parties communicating can exceed the total number of possible party—party connections within the network, because the connections are, in effect, shared by the parties.

These two features also allow individual parties to obtain access to "web pages." For example, a SERVER 9 may store multiple different web pages, each of which consists of a collection of data, and is managed by its own respective owner, or manager. Participant A may transmit a request for a page to SERVER 9, by delivering a request-packet to the network which is addressed to SERVER 9. (In practice, Participant A would probably utilize an Internet Access Provider to deliver the request packet, in order to eliminate any requirement on Participant A's part to deal with the protocols required by the network.) The network delivers the request-packet to SERVER 9.

When SERVER 9 receives the request-packet, it analyzes the message contained therein, identifies the particular web page which is sought, and then transmits the web page, in the form of packets, to Participant A, who requested the page. If the web page is large, it may be broken into multiple groups of packets, not all of which are initially transmitted to Participant A. Instead, the SERVER 9 would deliver an initial group of packets to Participant A, and then deliver other groups of packets, as requested.

Figure 2:
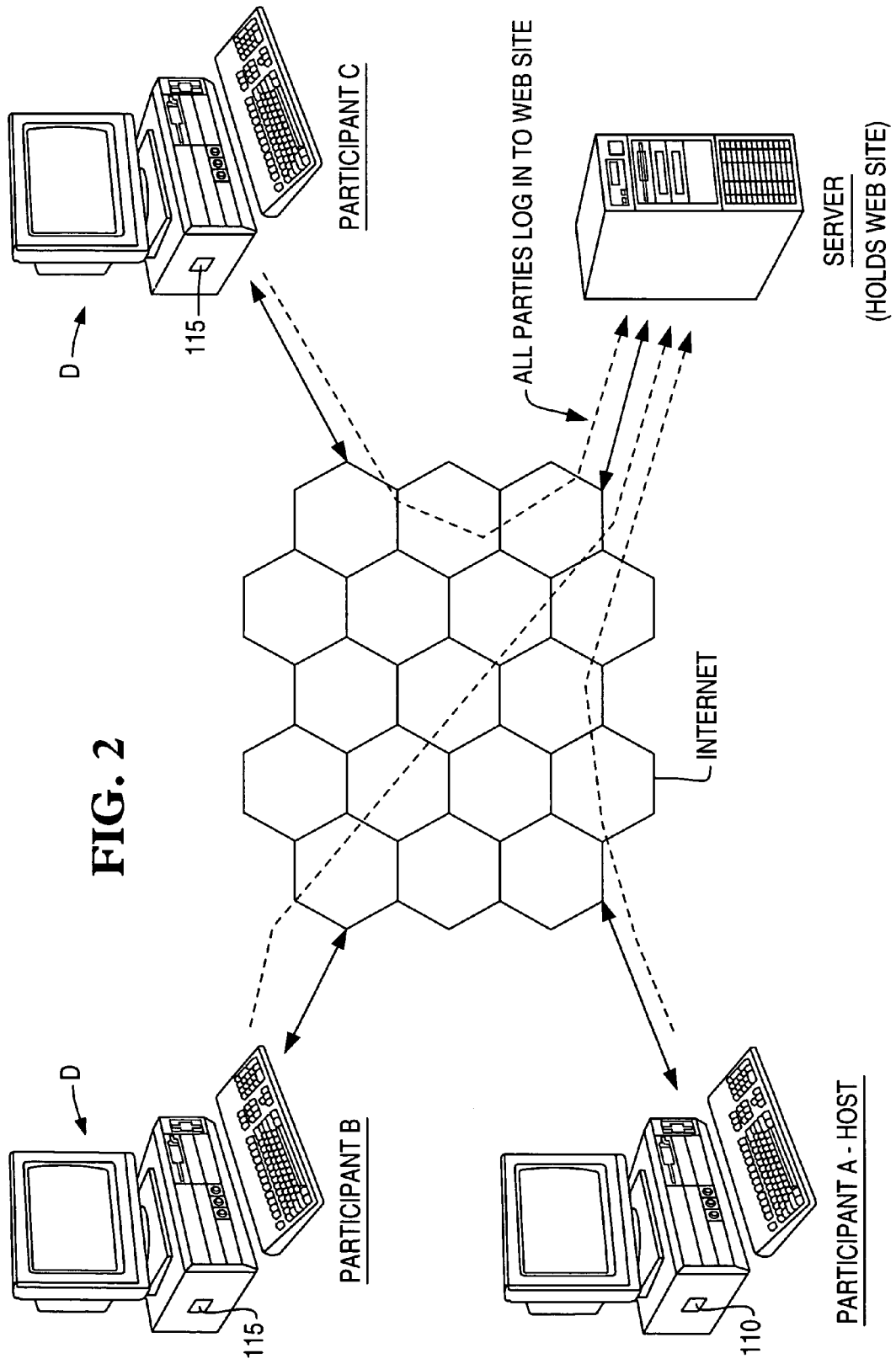
FIGS. 2 and 3 illustrate steps used by one form of the invention.
Figure 3:
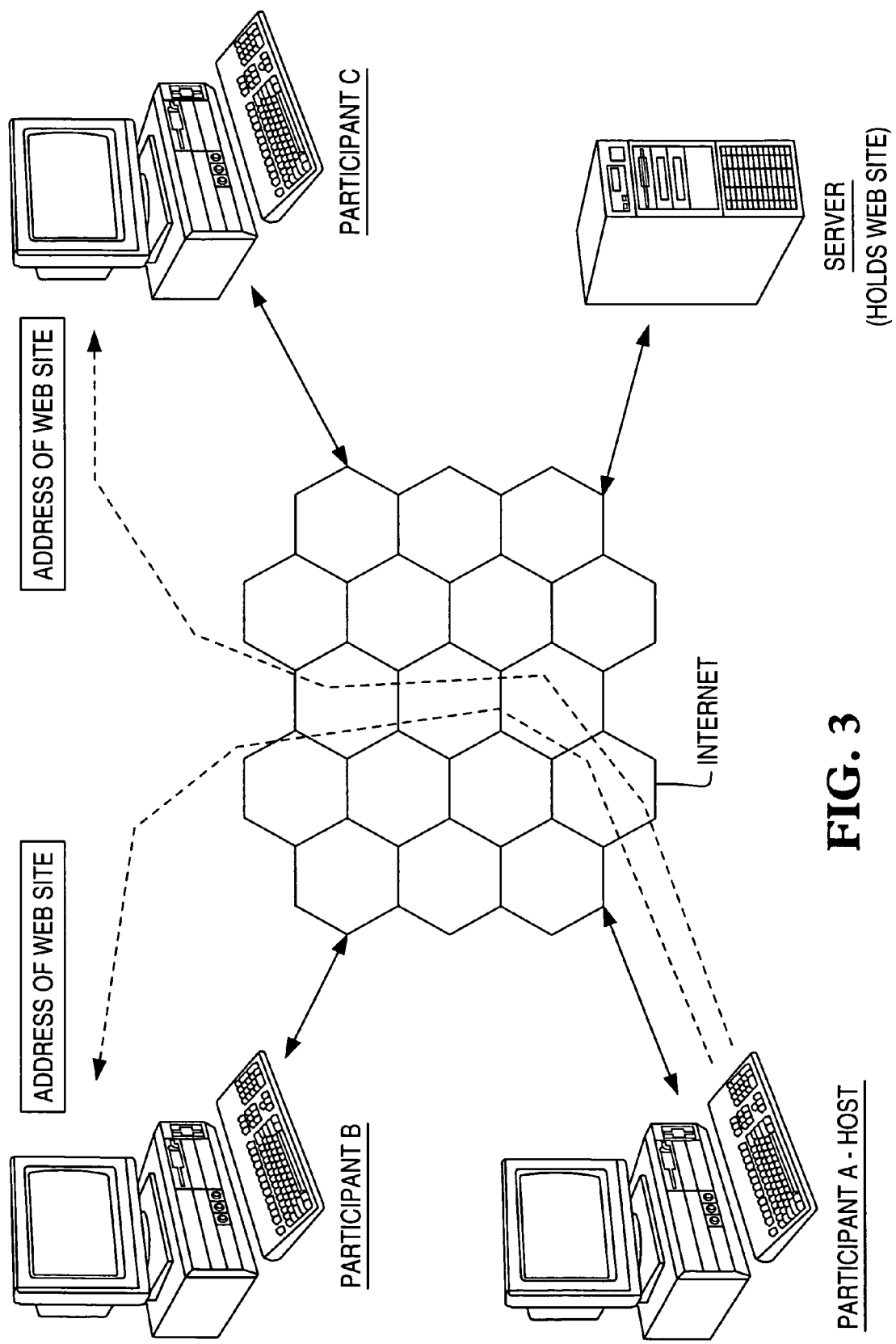

Synchronized browsing processes represent a refinement to this type of packet distribution, and will now be explained by way of a simplified example. First, as indicated in FIG. 2, all participants who wish to hold a conference perform the appropriate log-in procedures to a common web page stored by SERVER 9. The participants may receive the address of the web page from a common source, such as from participant A, who initiates the conference, as indicated in FIG. 3.

Figure 4:
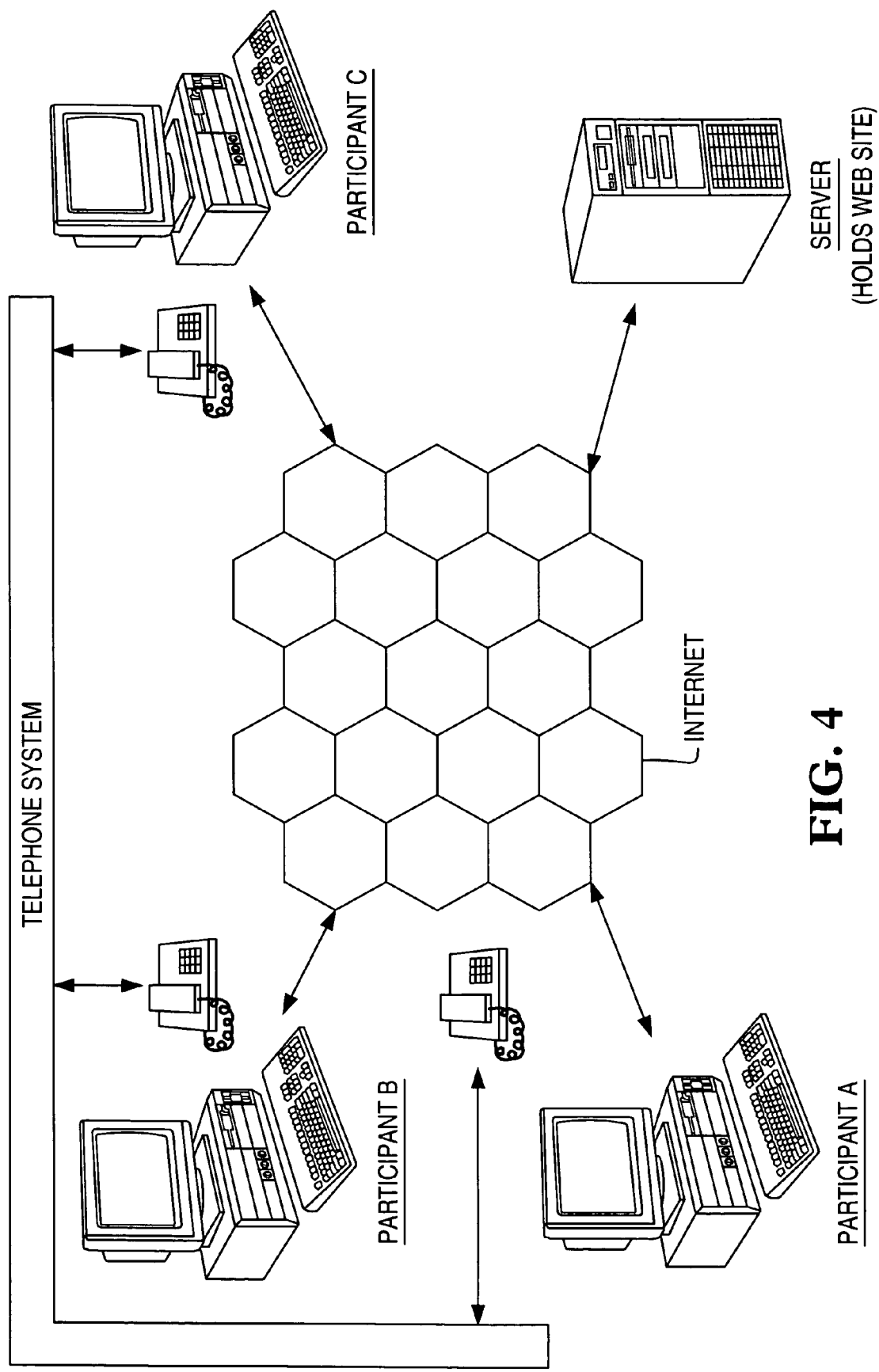
FIG. 4 illustrates two simultaneous data linkages used by the invention: a telephone conference and a network link.

In addition, and in parallel with the conference, the parties initiate a standard multi-party telephone conference, using the public telephone system, or other communication medium, as indicated in FIG. 4. At this time, two events are now occurring: (1) all participants are connected with each other through the telephone conference, and (2) all participants view the initial screen of the common web page, which was transmitted to their computers by the SERVER 9. This image is indicated by screen 12 in FIG. 5.

Figure 5:
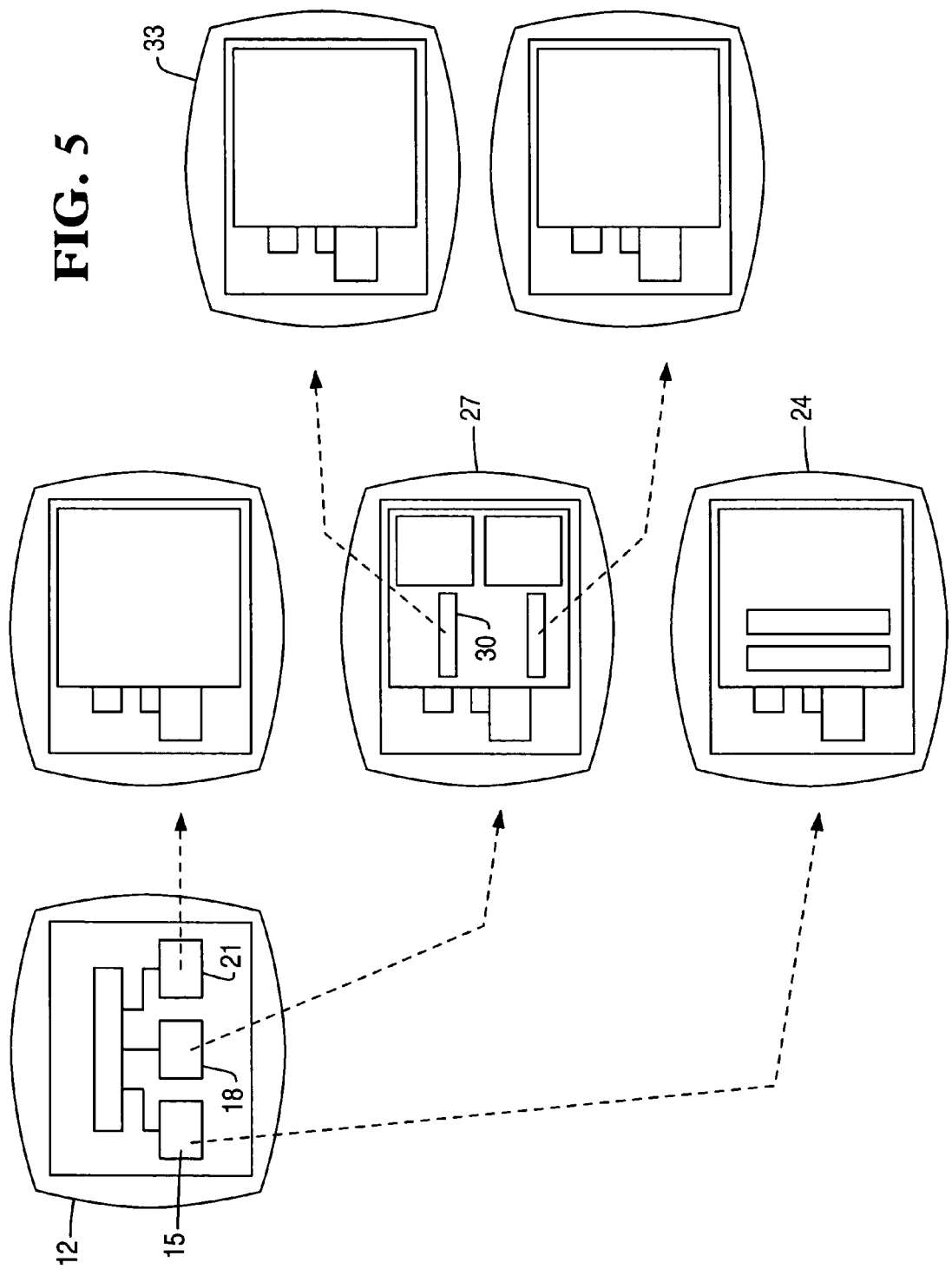
FIG. 5 illustrates navigation through a sequence of windows.

Many web pages contain multiple computer screens, and allow users to navigate among the screens. For example, screen 12 in FIG. 5 is shown as containing buttons 15, 18, and 21. Actuating button 15, by a pointing device, causes screen 24 to be displayed. Actuating button 18 causes screen 27 to be displayed.

Screen 27 may contain its own buttons, such as button 30, which causes further screens to be displayed, such as screen 33.

Figure 6:
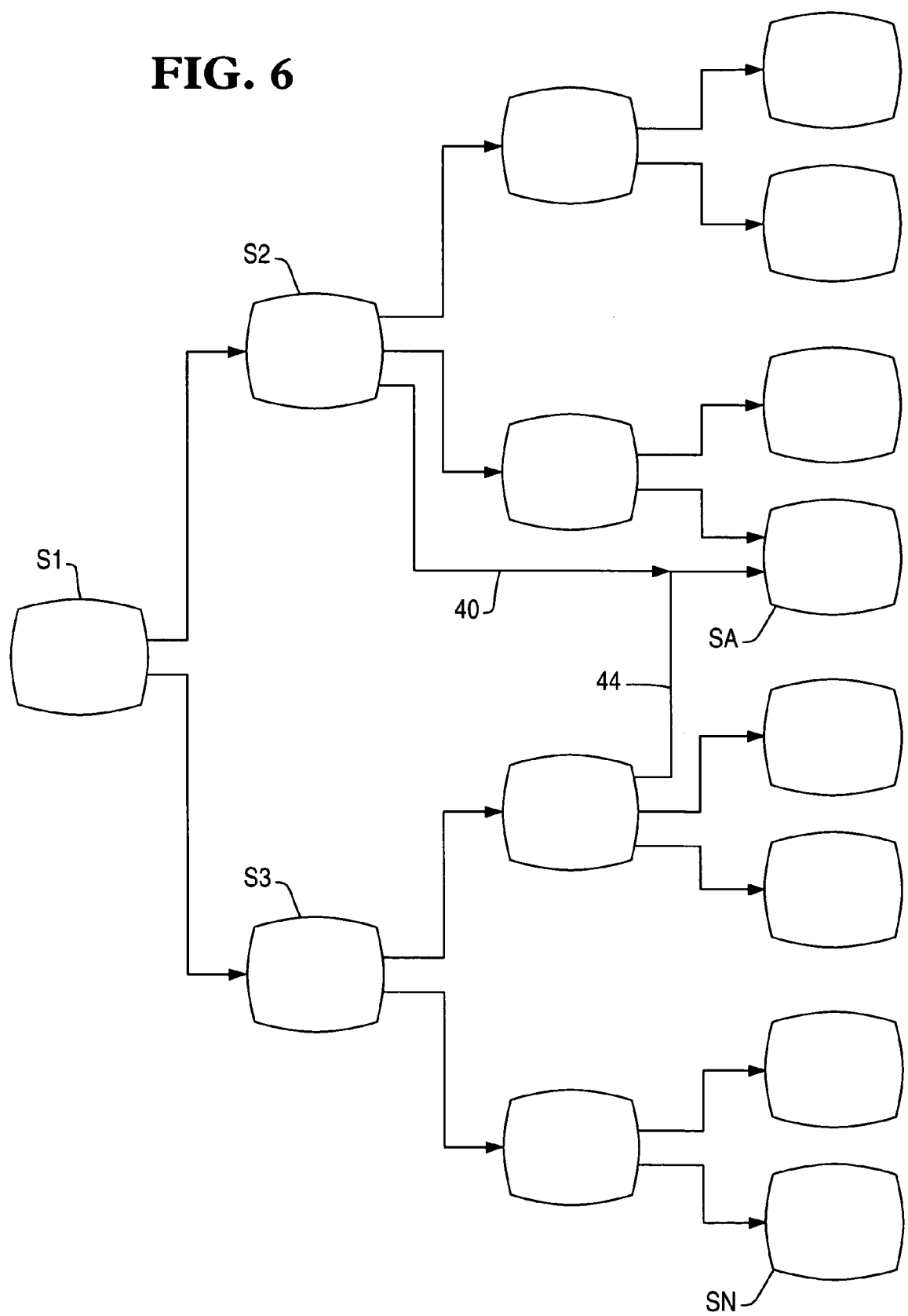
FIG. 6 is a flow chart representing the navigation of FIG. 5.

In the general case, the situation can be represented by a flow chart, as in FIG. 6. An initial screen S1 allows access to multiple successor screens, shown as two successors S2 and S3. Those screens lead to their own successors, as indicted. In addition, a given screen, such as screen SA, may be reachable through multiple routes, as indicated by arrows 40 and 44, so that successors do not necessarily possess unique ancestors.

Synchronized browsing allows Participant A in FIG. 2, who is designated as the "host," to navigate through a sequence of screens. While the host navigates, synchronized browsing causes the displays D of the other computers to display the same screens as Participant A's computer. Thus, under synchronized browsing, all computers display the same screen, in synchrony.

The invention enhances synchronized browsing, and may be used in conjunction with synchronized browsing systems. Alternately, the invention may be used on a stand-alone basis.

Figure 7:
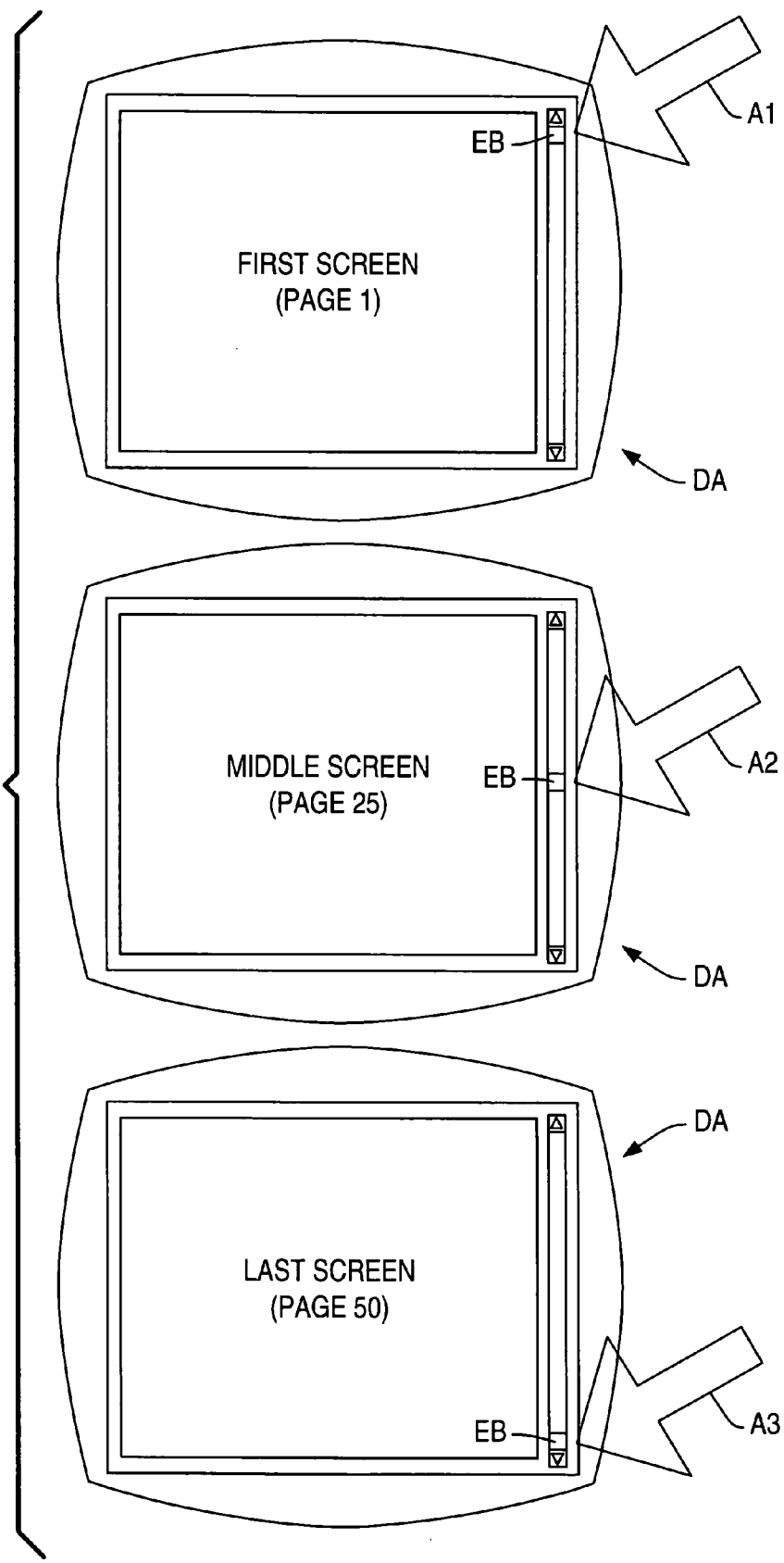
FIG. 7 illustrates scrolling.

FIG. 7 illustrates the appearance of the display DA of the host, namely, Participant A in FIG. 2, but at different times. For example, at one time, the display DA may display a FIRST SCREEN, as indicated. At other times, the display DA may display a MIDDLE SCREEN or a LAST SCREEN.

Participant A controls which screen is displayed through an "elevator bar" EB, indicated by the large arrows A1–A3, through a process called "scrolling." When the elevator bar EB is located at the highest position, as indicated by arrow A1, it causes the FIRST SCREEN to be displayed. When the elevator bar EB is located at a medial position, as indicated by arrow A2, it causes a MIDDLE SCREEN to be displayed. When the elevator bar EB is located at the lowest position, as indicated by arrow A3, it causes the LAST SCREEN to be displayed.

Figure 8:
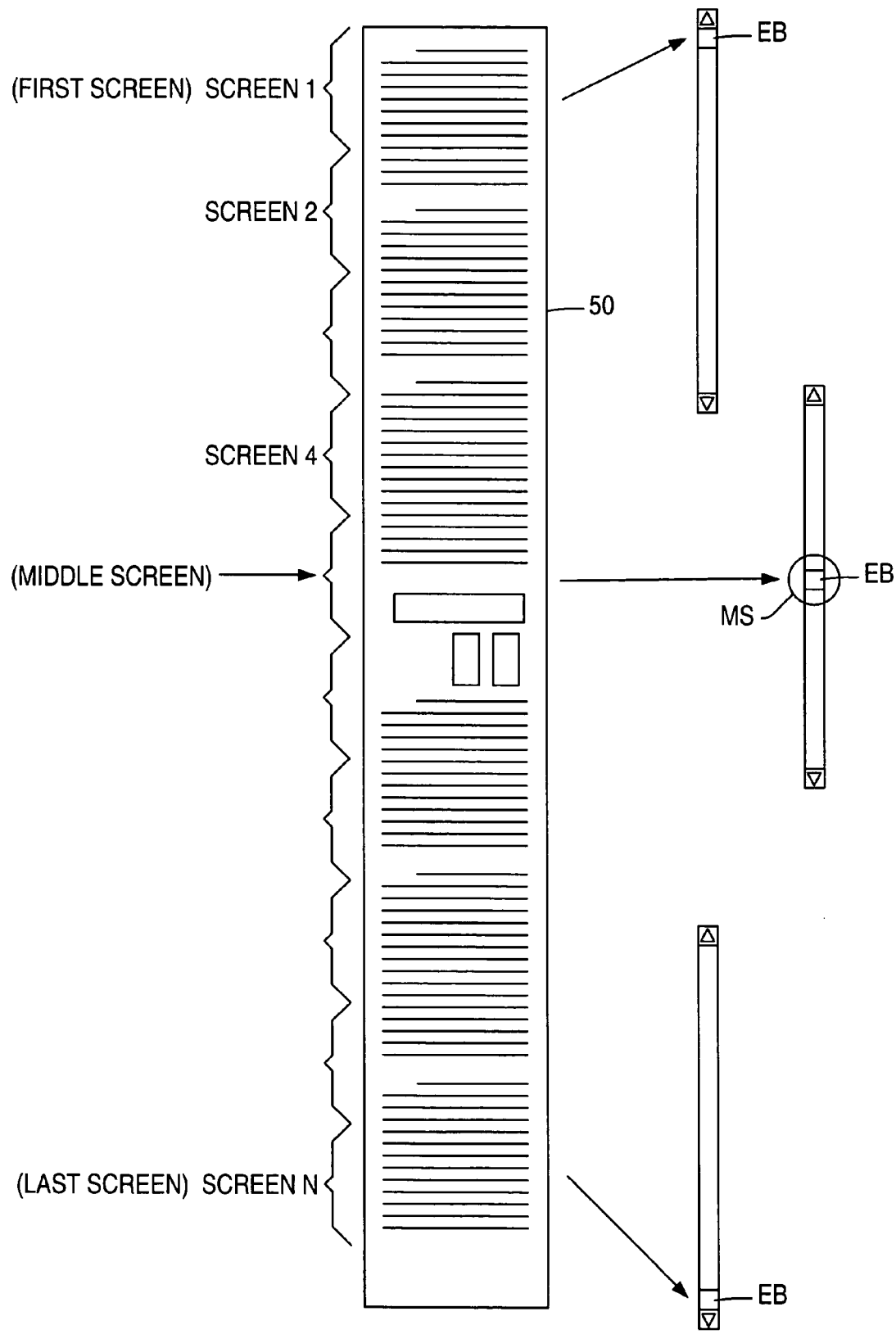
FIG. 8 illustrates one conception of a large document, such as a web page, and also a conception of the meaning of scrolling.

As FIG. 8 shows, the web page can be viewed as a long document 50. It is (conceptually) divided into screens, as indicated. The correspondence between the elevator bar EB and three of the screens is illustrated.

The elevator bar is manipulated by a pointing device (not shown), such as a mouse. The mouse communicates with the operating system (not shown) within the computer of Participant A in FIG. 2, through messages. Through the messages, the operating system ascertains when the mouse-cursor (not shown) is positioned over the elevator bar EB in FIG. 7, and when the mouse itself indicates that the bar EB is to be moved. (The latter indications are issued through buttons on the mouse.) When those messages are detected, the operating system scrolls through the document 50 in FIG. 8, displaying the screen indicated by the elevator bar EB. (Of course, this operation is not limited to full screens. Part of one screen, and part of a subsequent screen, may be displayed.)

One type of operating system which provides this type of operation is that sold under the name Windows, available from Microsoft Corporation, Redmond, Wash. Programming this operating system is described in the book *Programming Windows*, by Charles Petzold (Microsoft Press).

Figure 9:
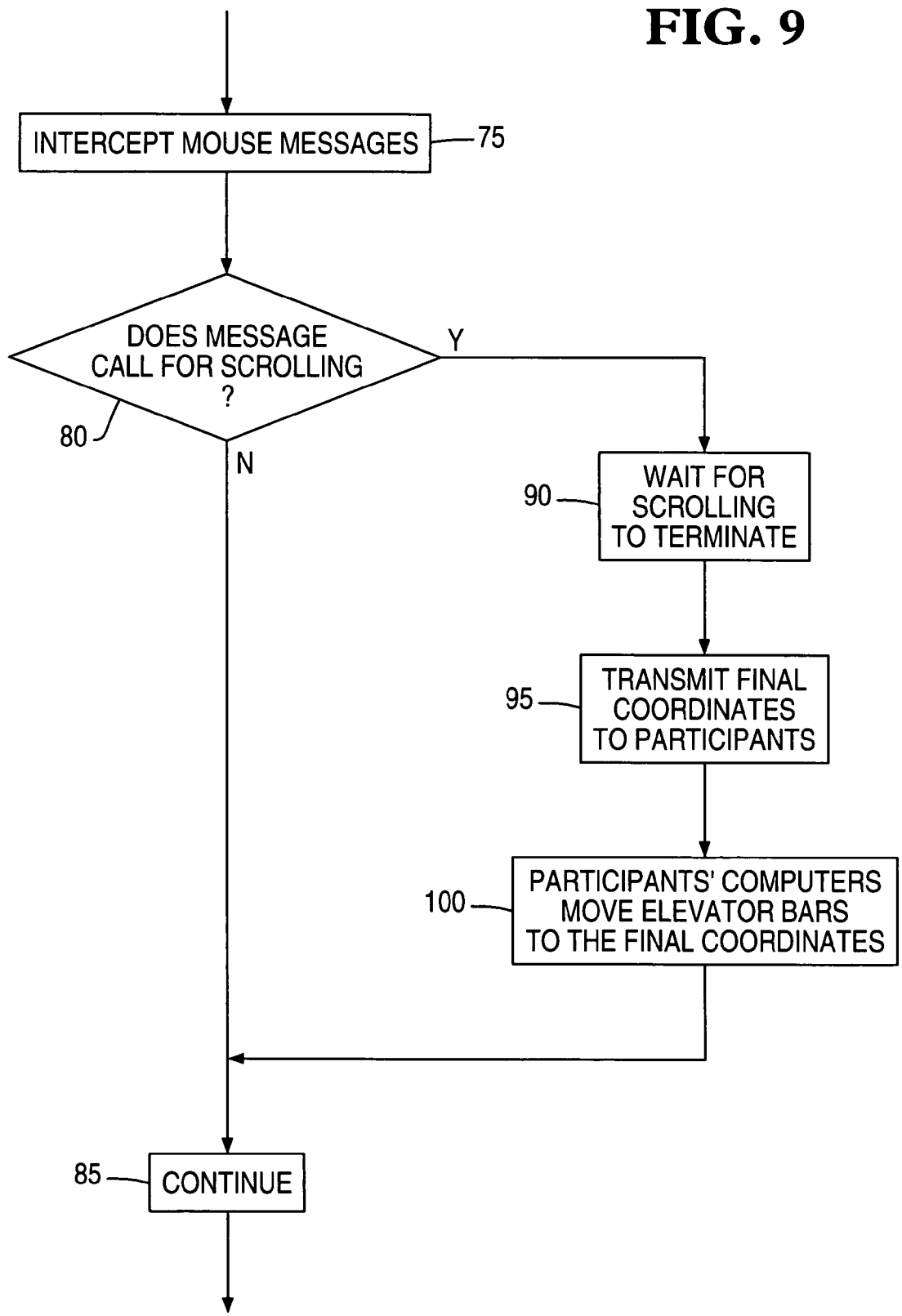
FIG. 9 is a flow chart illustrating logic implemented by one form of the invention.

The invention is overlaid onto the operating system. The invention intercepts mouse messages, and, in effect, distributes selected mouse messages, namely, those causing scrolling, to the other computers. Although all scrolling messages could be distributed to the other computers, thereby causing all computers to behave identically, a different approach is preferred. FIG. 9 is a flow chart illustrating the preferred procedure.

FIG. 9 illustrates logic which is interconnected into the mouse-processing routines of the operating system. Block 75 indicates that the invention intercepts mouse messages. Decision block 80 indicates that these messages are examined, and inquiry is made whether the messages request scrolling. If not, the NO branch is taken, and the mouse-processing routines continue in the normal manner, as indicated by block 85.

If the mouse messages do call for scrolling, then the YES branch is taken from block 80. Block 90 indicates that the invention waits for scrolling to terminate. For example, scrolling may be executed by the following sequence of events: (1) placing the mouse-cursor (not shown) over the elevator bar EB in FIG. 7, (2) actuating a button on the mouse itself (not shown), (3) physically moving the mouse, thereby causing the cursor to move, thereby "dragging" the elevator bar EB, and (4) releasing the mouse button.

When the last event occurs, namely, releasing the mouse button, the scrolling terminates. In this example, the invention would detect the mouse-message generated by that event, and, based on that event, would conclude that scrolling has terminated, as indicated in block 90.

At this time, block 95 is reached. That block transmits the coordinates of the elevator bar EB in FIG. 7 to the other computers. The term "coordinates" refers to the relative position of the elevator bar EB in FIG. 8, or an equivalent measure of position within the document 50 in FIG. 8. For example, the elevator bar EB can be viewed as travelling along a one-foot ruler. When located at zero inches, its position, in percentage points, is zero. When located at the six-inch mark, its position is 50 percent. When located at the twelve-inch mark, its position is 100 percent.

When the participants' computers receive the coordinates, they display the screen (or combination of partial screens) indicated by the coordinates. Specifically, if the host's display initially shows screen 1 in FIG. 8, and the host then scrolls to screen 4, after screen 4 is reached, the invention infers the arrival at screen 4, and then broadcasts the coordinates of the final screen, screen 4, to all the participants' computers. They then jump to screen 4.

ADDITIONAL CONSIDERATIONS

1. A distinction should be drawn between "scrolling" and "navigating." The former refers to scanning through document 50 in FIG. 8. By analogy, a movie film is "scrolled" when it runs through a motion picture projector.

During slow scrolling, all parts of document 50 will be visible. However, it is possible that, during rapid scrolling, parts of the document 50 may not be visible. For example, if the elevator bar EB is moved rapidly, the scan may occur so fast that parts of the underlying document may not appear.

This fact illustrates one characteristic of scrolling: when motion of the elevator bar EB terminates, part of the document will then be displayed. The displayed part is derived from the single screen's worth of the document 50 which brackets the elevator bar EB in some pre-defined manner. For example, the bracketing may span from one-half a screen's worth above the bar EB to one-half a screen's worth below the bar EB. In a sense, a miniature screen MS in FIG. 8 can be conceived as following the elevator bar EB. That part of the document contained within the miniature screen MS is displayed on the computer.

In contrast, "navigating" refers to jumping from screen-to-screen, as by moving along the flow chart of FIG. 6. In navigating, no elevator bar is used, so that no cessation of motion of the elevator bar occurs and, consequently, the cessation causes no part of a document to appear.

In one form of the invention, one computer scrolls, and, when scrolling terminates, the other computers immediately navigate to the same position in the document. For example, the display of the host in FIG. 2 may be scrolled. Upon termination of the scrolling, the computers of the other participants navigate to the corresponding position within the web page, and display the same part of the page which the host displays. But the other participants do not display the intervening parts, which the host would have displayed, if the host scrolled sufficiently slowly.

2. The transmission of the coordinates indicated in block 95 in FIG. 9 occurs by way of transmission of data packets, through the packet-switched network, to the computers of the other participants. Because of this, all participants in the conference must be in possession of an appropriate address, such as a URL (Universal Resource Locator), to guide the packets. Restated, the ordinary person, operating a computer at home, does not own the appropriate address, such as a URL, and cannot participate in the synchronized scrolling described herein.

3. The invention should be distinguished from other types of video conferencing systems. FIG. 4 shows two simultaneous communication links: (1) a standard telephone conference and (2) a network connection, although the latter, as explained above, is not maintained continuously. Both of these links can be of the low-bandwidth type, each having a bandwidth equivalent to a POTS (Plain Old Telephone Service) telephone channel, which is about 3500 Hz. Other types of video conferencing systems require high-bandwidth communication links, and many of these systems perform poorly with low-bandwidth links.

4. Apparatus which accomplishes the functions described above, and outlined in the flow chart of FIG. 9, is represented by block 110 in the host's computer in FIG. 2, as well as blocks 115 in the other computers. The latter blocks perform the navigation described above, when they receive the coordinates of block 95 in FIG. 9.

5. The invention provides particular usefulness in the context of video conferencing and remote collaboration systems. Presently available systems may be classified into three types:

(1) Full-featured video conferencing systems, which provide, for example, white-boarding, application-sharing, and full sharing of screens and cursors. However, these systems perform poorly when used with ordinary POTS telephone channels, operating at 28.8 Kilo-bits per second.

(2) General-purpose messaging and chatting programs. However, these do not provide significant meeting support, nor synchronized browsing.

(3) Simple tools in which common URLs (Uniform Resource Locators) are shared. The URLs act as addresses for the locations on the INTERNET where web pages can be found. Sharing the URLs allows the parties involved to view a common web page. However, in these tools, no person leads the other parties through a web page, or sequence of web pages: there is no synchronized scrolling.

Simply stated: these tools do not optimally support multi-party conferences utilizing low-bandwidth telephone channels.

An alternative approach to holding a multi-party conference without such tools is to distribute, in advance, paper documents to all participants. Then, utilizing a common telephone conference, one party leads the conference participants through the documents.

This approach, while appealing in theory, presents the practical problem that some conference participants are found to inevitably lose their places within the documents, and consequently must interrupt other participants (who are not, in general, located at the same site) in order to ascertain the current position within the documents.

For example, assume that a participant is reading a document, in synchrony with the leader of the conference. That participant may be interrupted by an associate. The participant's natural tendency is to place the document aside, without marking the current place, and give full attention to the associate. Later, the associate departs, and the participant wishes to re-join the conference. However, the participant does not know the leader's current position within the documents. That is true even if the participant had marked the place-of-interruption.

The invention provides a system which mitigates, or eliminates, many of the features of the systems just described. The invention emphasizes multi-party conferencing, handling conferences between at least two participants, and among as many as 75 participants, or more. In the general case, the participants are located at various different locations.

In addition to being useful in facilitating remote conferences, the invention is also useful in (1) Internet-based education, wherein a teacher leads a class of students, all located at different locations, and (2) a kickoff among sales professionals, in the introduction of a new product.

Under the invention, the conference is organized in a peer-to-peer format, over the Internet. That is, no distinct server is required, although one of the participating computers is designated as a Host, and coordinates the browsing as discussed in the Detailed Description of the Invention above.

In addition to the Host, two other designations are made: Guest and Scribe. A Guest is a conference participant; multiple Guests are involved in a multi-party conference. Also, the Host may temporarily appoint a Guest as Host, who then acts as a temporary leader. The Scribe keeps a record of the conference.

In addition to the Internet connection, all parties are connected in a normal POTS telephone conference. The Internet connection is independent of this telephone conference, and the invention does not control, or interfere with, that conference, except possibly to record it.

The Internet communications are undertaken using industry-standard Internet protocols and commands, which, of course, can be expected to change over time, and further change as new Internet-type networks become available.

As the Host navigates, travelling from web page to web page, and through individual web pages themselves, messages are sent to all participants informing them of the navigation, and allowing them to download the same web pages as the Host, and to move to the same locations within those web pages as the Host. Consequently, all participants view the same image, and that image follows the Host's image.

The Host is informed of the progress of each participant, so that no participant is left behind.

As stated above, the Host can appoint a Guest as Host. Several modes of operation are possible in this connection. In one, the Host makes a simple appointment, in effect, passing a baton. In another mode, a queue of Guests is established, wherein each is given an allotted time, or an allotted amount of web space to cover. When each Guest-Host finishes, the next Guest-Host is automatically appointed.

In the latter mode, the queue can be established in at least two ways. One, the Host can create the queue, by listing Guests. Two, the Guests can petition the Host for Host-appointments, and the Host lists the petitioning Guests in the queue.

All activities of the meeting are recorded by the Scribe. This recording may include a recording of the POTS telephone conversation. That recording may be digitized, and stored in a common location, and made available for downloading through the Internet.

Numerous substitutions and modifications can be undertaken without departing from the true spirit and scope of the invention. What is desired to be secured by Letters Patent is the invention as defined in the following claims.

What is claimed is:

1. In a conference among multiple computers which are operated by participants, the improvement comprising the following steps:
   a) detecting, in one computer, the occurrence of scrolling through a document;
   b) when said scrolling terminates, ascertaining which part of the document is being displayed by said computer; and
   c) after said ascertainment, transmitting to other computers data which enables them to display said part of the document.

2. Improvement according to claim 1, wherein the data consists essentially of a location of a group of data within the document.

3. Improvement according to claim 1, wherein the data enables the other computers to navigate to said part of the document, without scrolling.

4. Improvement according to claim 1, wherein all computers are linked by a packet-switched network, and the data is transmitted along said network.

5. Improvement according to claim 1, and further comprising the step of
   d) maintaining a telephone conference among the participants.

6. Improvement according to claim 1, wherein the scrolling at said one computer is accompanied by motion of an elevator bar displayed by said one computer.

7. Improvement according to claim 1, wherein said document comprises multiple pages, and said scrolling involves displaying different pages at different times.

8. Improvement according to claim 1, wherein said document cannot be displayed in a single computer display, and said scrolling enables the user to selectively
   i) display different parts of the document,
   ii) while other parts are not displayed.

9. Improvement according to claim 1, and further comprising
   d) providing synchronized browsing capability of a web site to a subset of computers in said group, wherein displays of the subset are caused to present common material.

10. In a conference among multiple computers which are operated by participants, the improvement comprising the following steps:
    a) detecting, in one computer, the occurrence of scrolling through a document, wherein parts of the document are sequentially displayed on a screen;
    b) when said scrolling terminates, ascertaining a coordinate within the document which is contained within the part of the document being displayed;
    c) transmitting a data packet to a packet-switched network for delivery to other of the multiple computers: and
    d) providing synchronized browsing capability of a web site to a subset of computers in said group, wherein displays of the subset are caused to present common material.

11. An apparatus, comprising:
    a) a computer-readable storage medium;
    b) software means, physically configured in the storage medium, for:
       i) detecting when scrolling through a document occurs in a computer;
       ii) detecting when said scrolling terminates, and, upon termination, ascertaining which part of the document is being displayed by said computer; and
       iii) transmitting to other computers a coordinate which enables them to display said part of the document.

12. A method of operating a group of computers, comprising the following steps:
    a) loading a common document into the computers;
    b) detecting scrolling at a first computer, which causes a displayed image to scroll from a first position within the document, through intermediate positions within the document, to a final position within a document; and b) transmitting information to other computers which are currently displaying the first position of the document, which causes the other computers to display said final position within the document, without displaying intermediate positions.

13. Method according to claim 12, wherein the document is loaded from a common web site, from a packet-switched, public-access network.

14. Method according to claim 12, wherein the information of paragraph (b) is transmitted to the other computers through a packet-switched, public-access network.

15. Method according to claim 12, wherein the scrolling at said first computer is accompanied by motion of an elevator bar displayed by said first computer.

16. Method according to claim 12, and further comprising
    c) providing synchronized browsing capability to at least some computers in said group.

* * * * *